April 15, 1952     T. H. AINSWORTH     2,592,637
CENTERING DEVICE FOR ENGINE TRUCKS Filed Sept. 29, 1948     2 SHEETS—SHEET 1

INVENTOR
THOMAS H. AINSWORTH
BY Rodney Bedell
ATTORNEY

April 15, 1952     T. H. AINSWORTH     2,592,637
CENTERING DEVICE FOR ENGINE TRUCKS
Filed Sept. 29, 1948     2 SHEETS—SHEET 2

INVENTOR
THOMAS H. AINSWORTH
BY Rodney Bedell
ATTORNEY

Patented Apr. 15, 1952

2,592,637

UNITED STATES PATENT OFFICE 2,592,637

CENTERING DEVICE FOR ENGINE TRUCKS

Thomas H. Ainsworth, Drexel Hill, Pa., assignor to General Steel Castings Corporation, Granite City, Ill., a corporation of Delaware Application September 29, 1948, Serial No. 51,755

3 Claims. (Cl. 105—174)

The invention relates to railway rolling stock and more particularly to a centering device and associated structure for supporting the vehicle body from the truck. The invention is especially adapted for use in two-wheel engine trucks.

One type of truck used heretofore mounted the bolster on the frame by means of a roller assembly including a pair of spaced parallel rollers held in position by a pair of links having separate short pins welded thereto and rotatably received in the ends of the rollers. Portions of the frame adjacent and parallel to the links opposed the links and maintained them in assembly with the rollers. With this arrangement, the pins frequently loosened at the points of welding and separated from the links causing the centering device to become inoperative.

The main object of the present invention is to overcome this difficulty by providing elongated pins rotatably received in the rollers and links and extending substantially from one frame portion to the other to maintain assembly of the links and rollers, thereby eliminating welding of the pins to the links with the associated disadvantages.

Other objects will be apparent to those skilled in the art from the following description and accompanying drawings, in which.

Figure 1:
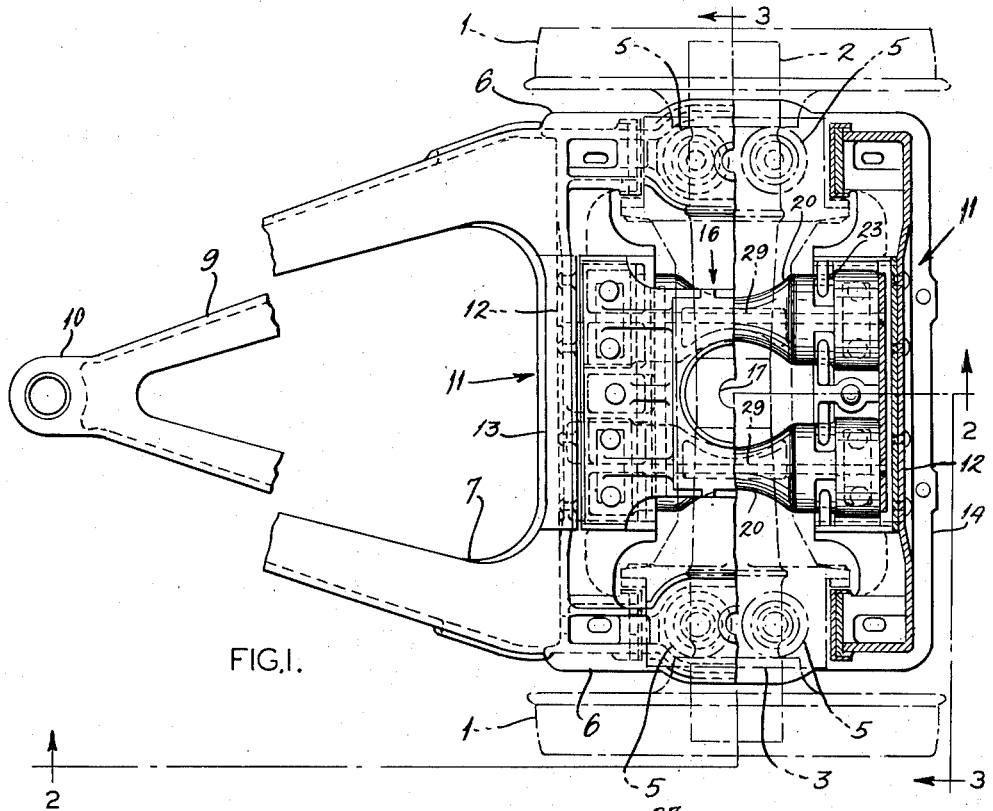
Figure 1 is in part a top view and in part a horizontal section taken approximately on the line 1—1 of Figure 2 and shows a two-wheel engine truck constructed according to the invention.
Figure 2:
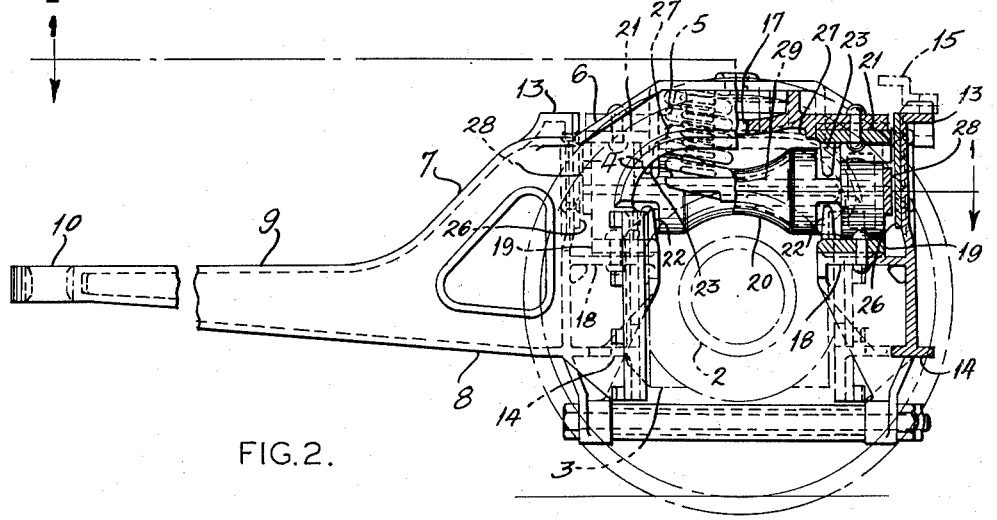
Figure 2 is in part a side view and in part a longitudinal vertical section taken approximately on the line 2—2 of Figure 1.
Figure 3:
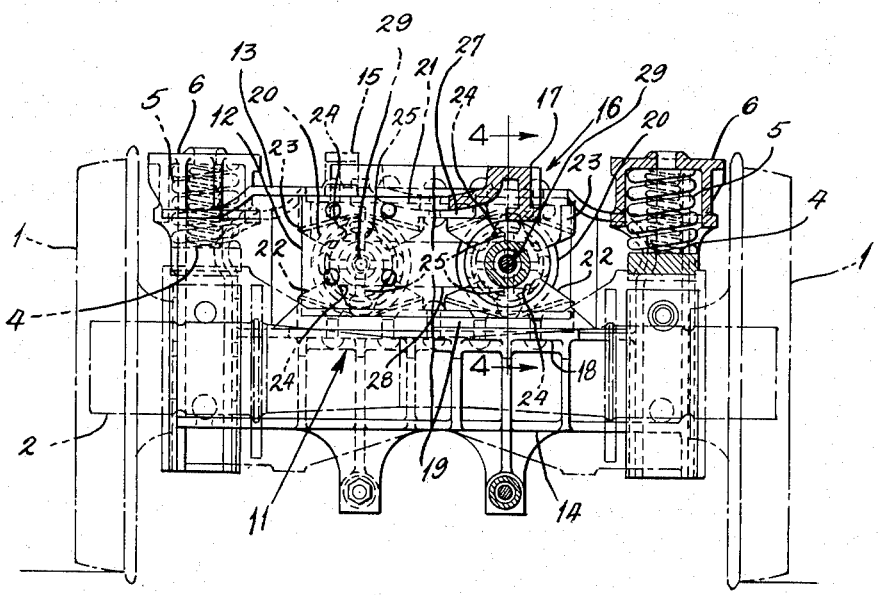
Figure 3 is in part an end view and in part a transverse vertical section taken approximately on the line 3—3 of Figure 1.
Figure 4:
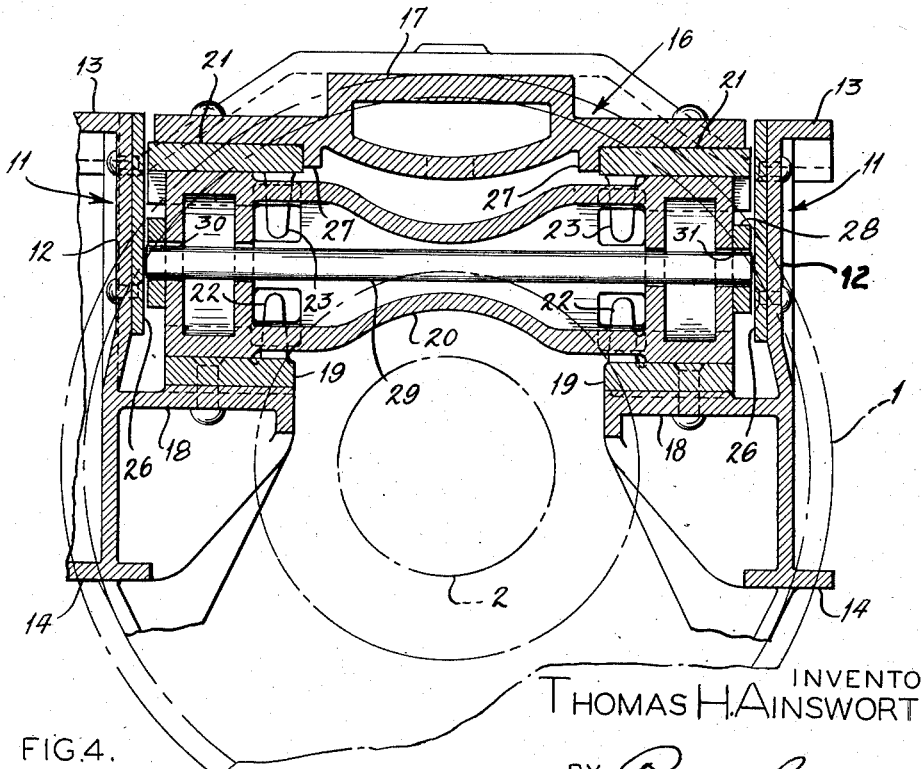
Figure 4 is a detailed longitudinal vertical section through a roller axis taken approximately on the line 4—4 of Figure 3 and drawn to enlarged scale.

The truck includes wheels 1, an axle 2 and journal boxes 3. A suitable spring seat 4 on each journal box supports spaced coil springs 5 which carry a truck frame. The latter includes wheel pieces 6 extending longitudinally of the truck abreast of the wheels. Each wheel piece 6 forms a pedestal for its journal box and a housing for its supporting springs.

Preferably a radius bar is formed integrally with the left hand end of the truck frame and includes an upper inclined element 7 and a lower more nearly horizontal element 8 extending from the upper and lower portions, respectively, of each side of the frame and merging with each other to form an arm 9 and the opposite arms unite at their ends in a bearing 10 by which the truck is pivoted to the locomotive frame.

Transoms 11 are formed integrally with and connect wheel pieces 6. Each transom 11 comprises a vertical wall 12 having upper and lower horizontal reenforcing flanges 13, 14. Flanges 13 mount clips 15 which prevent disassembly of the truck frame and a bolster 16 carried thereby and having a center plate 17 for mounting a vehicle body (not shown).

Each vertical wall 12 also has an inwardly extending horizontal flange 18 rigidly mounting a bottom roller plate 19 which forms seats spaced transversely of the truck for rollers 20 having their axes extending longitudinally of the truck and upon which bolster 16 rests. Each roller seat inclines upwardly from its central part, which normally seats the rollers, towards the opposite ends of the truck, to provide for movement of the bolster transversely of the truck frame and to return the roller to the normal position by gravity whenever the bolster moves laterally from central position. This action is accelerated by corresponding inclination of a top roller plate 21 which is mounted on rollers 20 directly above each bottom roller plate 19 and below bolster 16. Bottom and top roller plates 19, 21 have projecting lugs 22, 23 forming substantially V-shaped grooves 24 therebetween receiving spoke-like elements 25 on the rollers.

Each vertical wall 12 has a removable wear plate 26 applied to its inner face opposite the adjacent ends of rollers 20. Walls 12 and the associated wear plates 26 are high enough to oppose the outer transverse edges of top roller plate 21, the opposite edges of which bear against lugs 27 depending from bolster 16.

Rollers 20 extend parallel to one another and are held in spaced relation by links 28 which extend transversely to the roller axes and from one roller to the other, and by elongated pins 29 rotatably received in bearings 30, 31 in the rollers and links, respectively, and extending substantially from one wall 12 to the other. Walls 12 maintain assembly of the links and rollers but neither of plates 21 nor plates 26 engage the sides of the rollers near their peripheries.

A railway truck as described having a roller centering device including elongated pins extending substantially from one wall 12 to the other to maintain assembly of the links and rollers makes it unnecessary to weld the pins to the links and overcomes the difficulty encountered in trucks having separate short pins welded to the links.

The details of construction may be varied substantially without departing from the spirit of the invention, and the exclusive use of those modifications coming within the scope of the claims is contemplated.

What is claimed is:

1. In a railway vehicle truck including a bolster and a frame having opposing portions, a top roller plate on the underside of the bolster and a bottom roller plate on the frame, a pair of rollers mounted between said plates and between said frame portions and providing for relative movement of the frame and bolster transversely of the truck, individually detachable links at the ends of said rollers adjacent the frame portions and extending from one roller to the other, and elongated pins rotatably journalled in said links and rollers and extending substantially from one frame portion to the other with both ends of each pin opposing said frame portions and thereby being retained in position to maintain the rollers and links in assembly.

2. In a railway vehicle truck including a bolster and a frame having opposing transom walls, an upwardly facing roller plate on each transom wall, downwardly facing roller plates on the bolster, a pair of rollers between said plates and each extending longitudinally of the truck from near one of said transom walls to near the other transom wall and providing for relative movement of the frame and bolster transversely of the truck, each roller having an aperture extending axially therethrough, a link between each transom wall and the adjacent ends of said rollers and extending transversely of the rollers from one roller to the other, said links being apertured adjacent the roller apertures, and elongated headless pins journalled in the apertures in the rollers and links and extending substantially from one transom wall to the other and opposing the latter to maintain the rollers and links in assembly.

3. In a centering device for a railway vehicle truck including a frame having spaced opposing upright portions, a roller assembly mounted on the frame between the opposing portions and including a pair of elongated rollers, the ends of each roller being adjacent to and opposing said frame portions, there being restricted spaces between the roller ends and said frame portions, separable links at opposite ends of the rollers, each link extending from roller to roller and substantially filling the spaces between each of said frame portions and the adjacent roller ends, headless pins extending through the rollers and links, with their ends opposing said frame portions and thereby retained in the rollers to maintain the roller, link and pin assembly.

THOMAS H. AINSWORTH.

REFERENCES CITED

The following references are of record in the file of this patent:

UNITED STATES PATENTS

| Number | Name | Date |
|---|---|---|
| 172,176 | Roberts | Jan. 11, 1876 |
| 958,067 | Taylor | Feb. 1, 1910 |
| 1,657,777 | Blunt | Jan. 31, 1928 |
| 1,678,321 | Blunt | July 24, 1928 |
| 1,689,261 | Todd | Oct. 30, 1928 |
| 1,751,336 | Kjolseth | Mar. 18, 1930 |
| 2,044,575 | Kjolseth | June 16, 1936 |